US 008502888B2

(12) United States Patent
Matsushita

(10) Patent No.: US 8,502,888 B2
(45) Date of Patent: Aug. 6, 2013

(54) IMAGE DATA MANAGEMENT APPARATUS AND METHOD, IMAGE DATA SEARCH APPARATUS AND METHOD, AND RECORDING MEDIUM

(71) Applicant: Canon Kabushiki Kaisha, Tokyo (JP)

(72) Inventor: Takeshi Matsushita, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/715,877

(22) Filed: Dec. 14, 2012

(65) Prior Publication Data
US 2013/0100316 A1    Apr. 25, 2013

Related U.S. Application Data

(63) Continuation of application No. 11/874,340, filed on Oct. 18, 2007, now Pat. No. 8,355,060.

(30) Foreign Application Priority Data

Dec. 28, 2006  (JP) ................................ 2006-354671

(51) Int. Cl.
H04N 5/76    (2006.01)
G06F 7/00    (2006.01)

(52) U.S. Cl.
USPC ...................................... 348/231.5; 707/706

(58) Field of Classification Search
USPC .................. 348/231.99, 231.2, 231.3, 231.5, 348/333.02; 707/706, 711, 713, 722, 736, 707/746

See application file for complete search history.

(56) References Cited

U.S. PATENT DOCUMENTS

| 7,133,863 | B2 * | 11/2006 | Teng et al. ..................... 707/708 |
| 7,634,158 | B2 * | 12/2009 | Nakase et al. ................ 382/305 |
| 8,244,723 | B2 * | 8/2012 | Dean et al. ..................... 707/723 |
| 2006/0044417 | A1 * | 3/2006 | Tashiro et al. ............. 348/231.3 |
| 2006/0100976 | A1 * | 5/2006 | Hsieh ................................. 707/1 |
| 2007/0094254 | A1 * | 4/2007 | Cutts et al. ......................... 707/5 |
| 2008/0133479 | A1 * | 6/2008 | Zelevinsky et al. ............... 707/3 |
| 2011/0055759 | A1 * | 3/2011 | Robert et al. .................. 715/825 |
| 2012/0131049 | A1 * | 5/2012 | Ogilvie ........................... 707/769 |
| 2012/0170075 | A1 * | 7/2012 | Minamino et al. ........... 358/1.15 |

* cited by examiner

Primary Examiner — Timothy J Henn
(74) Attorney, Agent, or Firm — Canon USA, Inc., IP Division

(57) ABSTRACT

A data management apparatus capable of managing data stored in a storage unit includes a designation unit, setting, search, management units, and a first display control unit. The setting unit sets, based on predetermined date information included in designated data, information on a date to data to be stored and is other than the designated data. The search unit searches data, from among stored data, based on a date or period search condition. The management unit manages data to add, from among the searched data, data of known predetermined date information to a first result list and data to which the date information has been set to a second result list. The first display control unit causes a display such that each displayed data is accompanied with an identifier for distinguishing whether the data is searched out from among the data of the first or second result list.

12 Claims, 14 Drawing Sheets

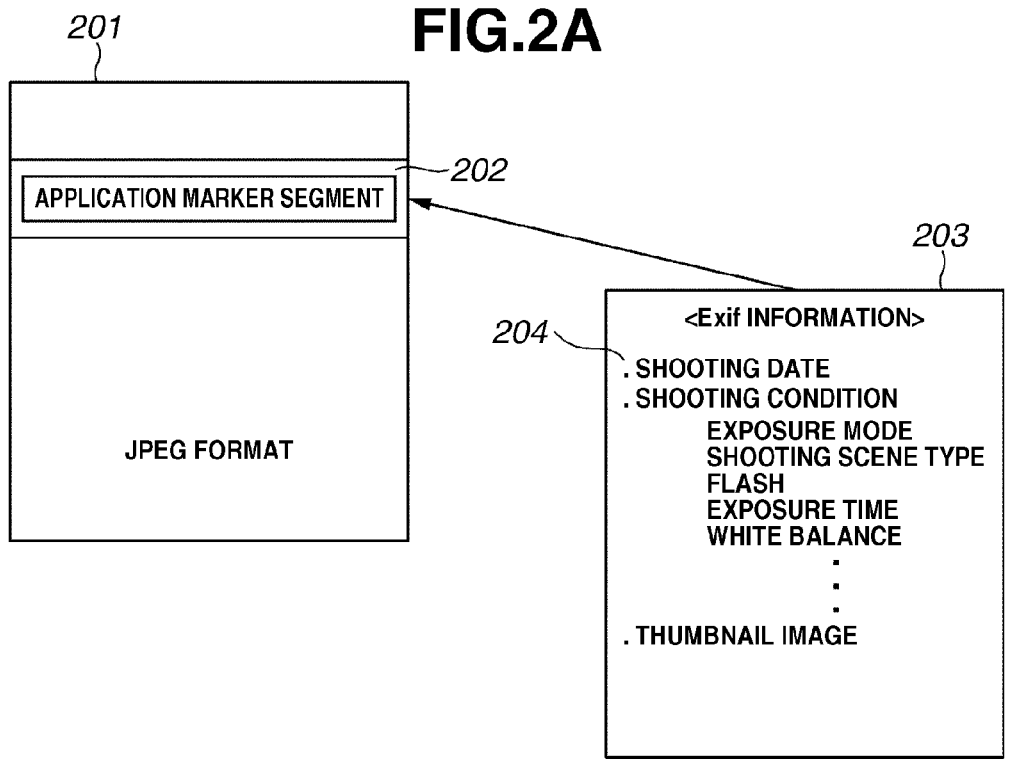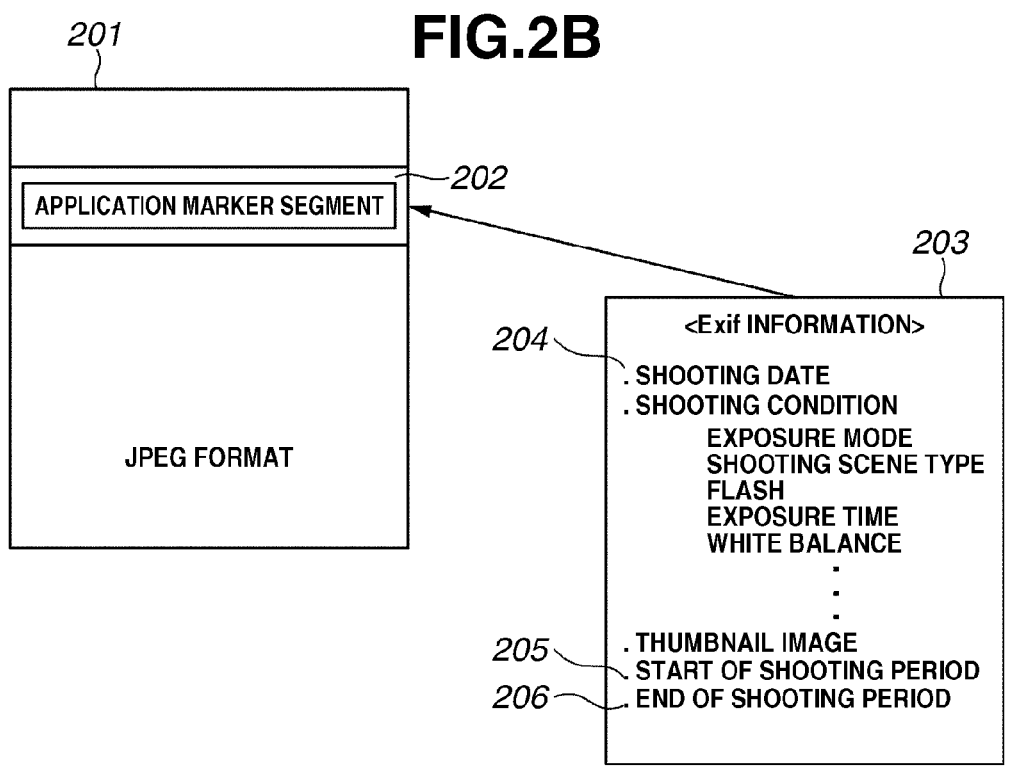

FIG.10

| D1 | D2 | Type |
|---|---|---|
| in | in | Type1 |
| in | out | Type2 |
| out | in | Type3 |
| out | out | Type4 |

IMAGE DATA MANAGEMENT APPARATUS AND METHOD, IMAGE DATA SEARCH APPARATUS AND METHOD, AND RECORDING MEDIUM

CROSS REFERENCE TO RELATED APPLICATIONS

The present application is a continuation of U.S. patent application Ser. No. 11/874,340, filed Oct. 18, 2007, the content of which is expressly incorporated by reference herein in its entirety. Further, the present application claims priority from Japanese Patent Application No. 2006-354671, filed Dec. 28, 2006, which also is hereby incorporated by reference herein in its entirety.

BACKGROUND OF THE INVENTION

1. Field of the Invention

The present invention relates to an image data management apparatus and method for managing image data and an image data search apparatus and method.

2. Description of the Related Art

An image management system (also referred to as "an electronic album") has recently been developed which manages digital image data captured by digital still cameras or digital image data obtained by scanning images (e.g., images captured on silver-halide films) with a personal computer or a dedicated apparatus to display the digital image data on a monitor, such as a cathode-ray tube (CRT) or a liquid crystal display.

Such an image management system stores image data in a storage, such as a hard disk or a high-capacity flash memory, and includes a search function of searching for image data corresponding to a designated shooting date. A user can search for desired image data among many image data stored in the storage by using the search function.

For example, Japanese Patent Application Laid-Open No. 2002-358306 discusses an image information search method for carrying out searching based on date information associated with an event so as to facilitate user's image searching based on a date.

However, while the shooting date and time is automatically appended to image data shot by a digital still camera during shooting, the shooting date and time may not be appended to image data captured by a scanner.

Japanese Patent Application Laid-Open No. 2006-148692 discusses an image input system which analyzes the shooting date and time contained in an image via an optical character recognition (OCR) when the image is read by a scanner, and appends shooting date and time information to the scanned image data, as in the case of a digital still camera.

Japanese Patent Application Laid-Open No. 2000-261749 discusses an image management system which appends shooting date and time information to image data containing no shooting date and time by using a calendar type user interface.

Japanese Patent Application Laid-Open No. 8-30763 discusses a mechanism for, when an attribute ambiguous in representation such as a level of clearness is input, graphically displaying a preview image of an image to which the same attribute has been appended and its attribute value so as to facilitate user's appending an ambiguous attribute to the image.

However, the following problems may occur in the system that appends shooting date and time information to image data containing no shooting date and time information: (1) when no shooting date and time is contained in an image, shooting date and time information cannot be obtained since analysis via an OCR cannot be carried out, and (2) even in cases where a user manually inputs shooting date and time information, the inputted date may not be reliable since it is often difficult for the user to remember shooting date and time.

As a result, in the case of processing image data shot by digital still camera and image data captured by a scanner in a mixed manner, a user cannot search both image data in a unified manner by using the shooting date and time as a search key.

SUMMARY OF THE INVENTION

An embodiment of the present invention is directed to an image data management apparatus which enables a user to easily set information of a given degree of certainty, i.e., shooting period information, to image data containing no shooting date information even without remembering an exact date, and to search image data in a unified manner by using a date and a period as search keys when image data shot by a digital still camera and image data captured by a scanner are processed in a mixed manner.

According to an aspect of the present invention, an embodiment is directed to an apparatus capable of managing image data. The apparatus includes a display unit configured to display image data whose predetermined date is known among image data stored in a storage unit, and a setting unit configured to set a date to another image data using the image data displayed on the display unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A and 2B are diagrams illustrating an example of an Exchangeable Image File Format (Exif) file of a Joint Photographic Experts Group (JPEG) format and shooting period information appended to the file.

FIG. 10 is a diagram illustrating a type classification table.

DETAILED DESCRIPTION OF THE EMBODIMENTS

Various exemplary embodiments, features, and aspects of the invention will be described in detail below with reference to the drawings.

First Exemplary Embodiment

An exemplary embodiment of the present invention will be described by taking an example of a multifunction printer. In other words, in an embodiment, the multifunction printer functions as an image data management apparatus and/or an image data search apparatus. However, it is noted that a computer (e.g., PC), a server or other suitable information processing apparatus can also be used as an image data management apparatus and/or an image data search apparatus according to an embodiment of the present invention.

The multifunction printer includes a printer, a card reader, a scanner with a film reading function, and a hard disk drive (HDD). Image data read from the scanner or the card reader in addition to those from a printing function and a copying function are stored in the HDD, and a user can view or print image data stored in the HDD by using a display unit (display).

Figure 1:
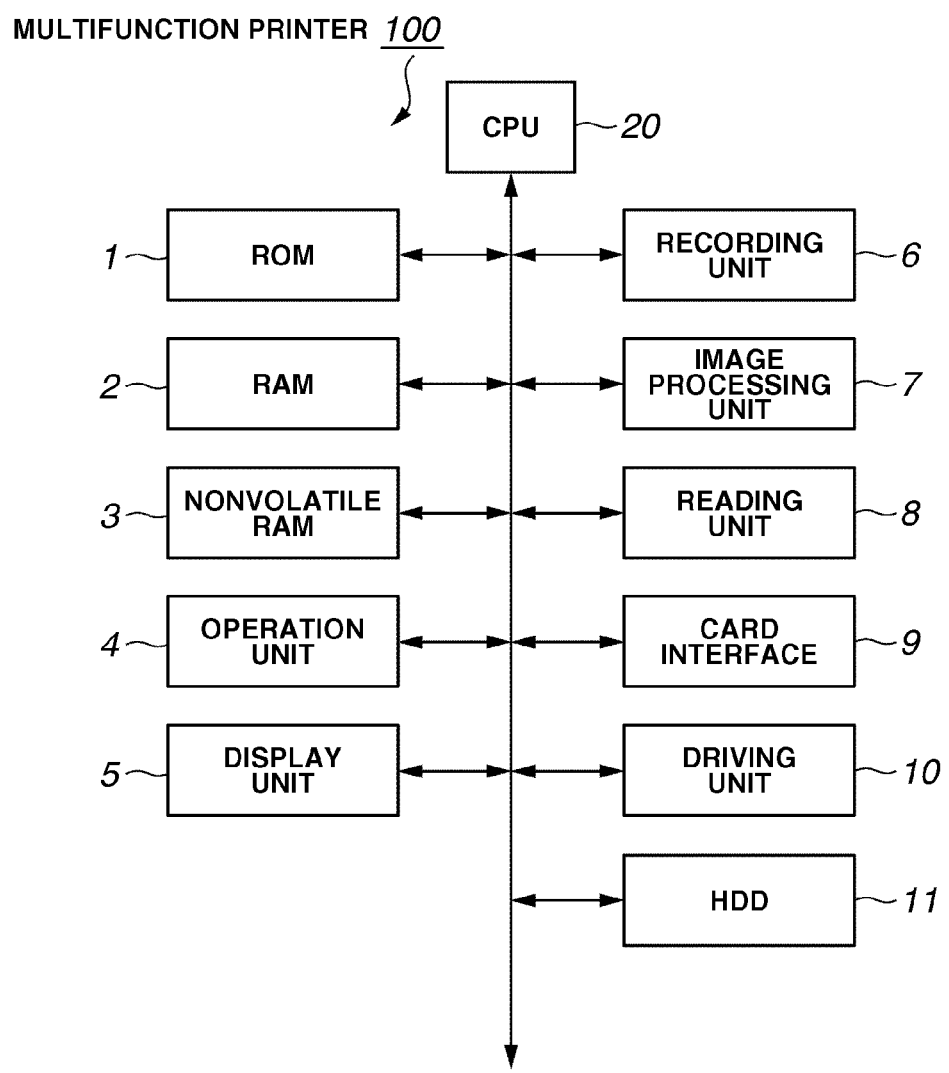
FIG. 1 is a block diagram illustrating a configuration of a multifunction printer according to an exemplary embodiment of the present invention.

FIG. 1 is a block diagram illustrating a configuration of the multifunction printer according to an exemplary embodiment of the present invention. In FIG. 1, the multifunction printer 100 includes a central processing unit (CPU) 20, a read-only memory (ROM) 1, a random access memory (RAM) 2, a nonvolatile RAM 3, an operation unit 4, a display unit 5, a recording unit 6, an image processing unit 7, a reading unit 8, a card interface 9, a driving unit 10, and a hard disk drive (HDD) 11.

The CPU 20 controls various functions of the multifunction printer 100, and executes programs stored in the ROM 1 according to an operation on the operation unit 4.

The ROM 1 stores a control command program of the multifunction printer 100. The RAM 2 functions as a work area of the CPU 20. The nonvolatile RAM 3 is a static random access memory (SRAM) which includes a battery backup function, and stores data unique to the multifunction printer 100.

The operation unit 4 includes various keys, such as a monochrome copy start key, a color copy start key, a mode key for designating a mode of copy resolution or image quality, a stop key for stopping a copying operation, a numeric keypad or a registration key for inputting the number of copies, and a cursor key for designating image file selection. The CPU 20 detects a depression state of each key, and controls each unit according to the depression state.

The display unit 5 includes, for example, a liquid crystal display unit (LCD) and a LCD driver, and executes various displays under control of the CPU 20.

The recording unit 6 includes, for example, an ink head of an ink jet type, and a general-purpose IC. The recording unit 6 reads data recorded in the RAM 2 to print and output a hard copy under control of the CPU 20.

The image processing unit 7 carries out image processing, such as image analysis, thumbnail creation, thumbnail correction, or output image correction. Print data obtained through such image processing is stored in the RAM 2. In recording the print data stored in the RAM 2 by the recording unit 6, when a predetermined necessary amount is reached, the recording unit 6 executes a recording operation.

The reading unit 8 includes a charge-coupled device (CCD) sensor, and reads an original image to output analog luminance data of red (R), green (G), and blue (B) colors. The reading unit 8 may use a contact image sensor (CIS) in place of the CCD sensor. The reading unit 8 also includes a film reading unit configured to output analog luminance data by scanning a film as in the case of an ordinary document image.

The card interface 9 reads an image file shot by, for example, a digital still camera, and recorded in a memory card according to an operation on the operation unit 4.

The driving unit 10 includes a stepping motor for driving a feed/discharge roller (not illustrated), a gear for transmitting a driving force of the stepping motor, and a driver circuit for controlling the stepping motor in operations of the reading unit 8 and the recording unit 6.

The HDD 11 stores image data read from the reading unit 8 or the card interface 9, and various files generated by the CPU 20.

Next, setting of a shooting period will be described.

The shooting period is defined by two dates, i.e., start and end dates. Image data to which such a shooting period is set (appended or associated) has a high possibility that the image was actually shot within the shooting period, i.e., at some point in time between the start date and the end date.

FIGS. 2A and 2B illustrate an example of an Exif file of Joint Photographic Experts Group (JPEG) format generally used by a digital still camera and information of a shooting period appended to the file. As illustrated in FIG. 2A, the Exif file 201 of JPEG format generally used by a digital still camera includes an application marker segment 202 for storing data, such as shooting information or thumbnail information. The application marker segment 202 includes Exif information 203 embedded therein. Data such as a shooting date 204 or a shooting condition is recorded in the Exif information 203.

According to an exemplary embodiment, as illustrated in FIG. 2B, data of start and end dates 205 and 206 of a shooting period are appended to the Exif information 203. In the present embodiment, a shooting date of the Exif information 203 and start and end dates of the shooting period are referred to as "date". However, a format regarding date and time represented by 20 bytes according to the Exif standard can be employed. This format contains not only a date but also hour, minute, and second. Thus, the date can contain time of hour, minute, and second according to an exemplary embodiment of the invention. For easy description, however, a shooting date and a shooting period are represented by dates.

In image data shot by a general digital still camera, information of the shooting date 204 is appended to the Exif information 203, and the image data is stored in a recording medium. When the image data is copied to the multifunction printer 100 via the recording medium to be read, the information of the shooting date 204 of the Exif information 203 can be read to be displayed together with images, and the images can be rearranged in order of shooting dates.

On other hand, no Exif information is generally appended to image data captured by a scanner. Accordingly, information of a shooting period is set to be appended to image data containing no accurate shooting date information, for example, no Exif information, according to a method described below.

According to an exemplary embodiment, information of a shooting period is appended by using the format of the Exif file. However, information of a shooting period can be stored as another file, and its file name can be written in the image file. A relation between the image file and the file of information of a shooting period can be managed by another file.

As information of a shooting period is managed based on two dates, i.e., start and end dates, the shooting period can be flexibly represented. For example, when a shooting period is represented by a keyword "NEW YEAR", only a fixed shooting period from January 1 to January 3 can be represented. Thus, a period that cannot be represented by the keyword, such as a period from January 2 to January 5, cannot be held as shooting period information. To flexibly deal with such a shooting period which cannot be represented by the keyword alone, information of a shooting period is managed based on the two dates, i.e., start and end dates.

Next, a method for appending information of a shooting period will be described below with reference to FIGS. 3A to 3C.

The user operates the operation unit 4 while viewing the display unit 5 of the multifunction printer 100 to enter a shooting period information appending mode. FIGS. 3A to 3C illustrate a display example on the display unit 5 in the shooting period information appending mode.

First, referring to FIG. 3A, a display screen in the shooting period information appending mode will be described in detail. The display screen of the shooting period information appending mode is divided into two fields, i.e., an upper field 301 and a lower field 302.

In the upper field 301, among image data stored on the HDD 11, thumbnail images of image data whose shooting dates are known, specifically, thumbnail images of image data in which the shooting dates 204 of Exif information 203 contain shooting dates of the images, are sorted and displayed in order of date.

Figure 3A:
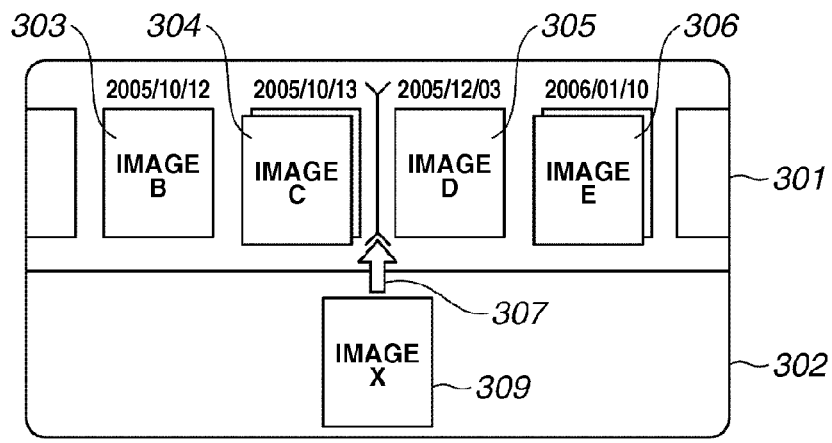
FIGS. 3A to 3C are diagrams each illustrating a display example on a display unit in a shooting period information appending mode.
Figure 3B:
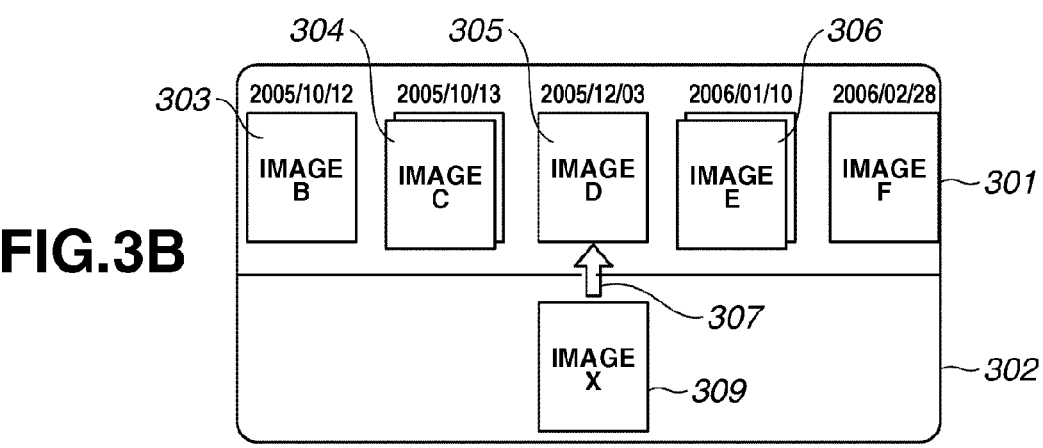
Figure 3C:
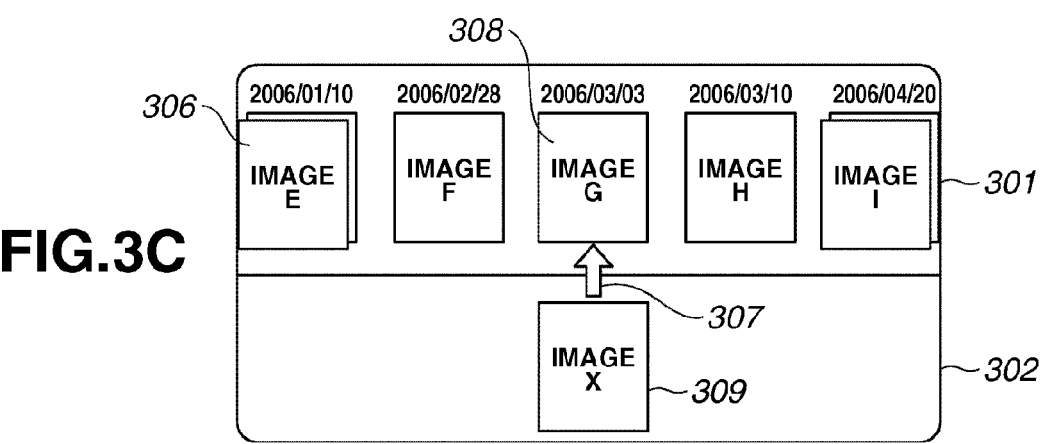

In the state illustrated in FIG. 3A, in the upper field 301, four thumbnail images of images B to E (303 to 306) and shooting dates thereof are displayed. When there is a plurality of images whose shooting dates are identical among the images displayed in the upper field 301, the images are stacked to be displayed as in the case of the images C and E (304 and 306).

An arrow 307 illustrated in the center of the screen indicates which image or which inter-image portion the user designates. In the example illustrated in FIG. 3A, the arrow 307 indicates a portion between the images C and D (304 and 305). In this case, the user designates a portion between the images C and D (304 and 305). In the example illustrated in FIG. 3B, the arrow 307 indicates the image D (305). In this case, the user designates the image D (305).

When the user further operates the operation unit 4 to instruct scrolling right or left in the screen of the upper field 301, scrolling is executed left or right in the screen of the upper field 301, and a position indicated by the arrow 307 is alternately changed among an inter-image, an image, and an inter-image. More specifically, when one left scrolling is instructed in the upper field 301 while the arrow 307 is between the images C and D (304 and 305) as illustrated in FIG. 3A, the image D (305) is designated (selected) as illustrated in FIG. 3B. When six left scrolling operations are instructed in a state illustrated in FIG. 3B, scrolling is largely executed left to select (designate) an image G (308) as illustrated in FIG. 3C. When the user instructs right scrolling, an operation is reverse to the aforementioned operation.

In the lower field 302, only one thumbnail image of image data containing no shooting date information among the image data stored on the HDD 11 is displayed. In the example illustrated in FIG. 3A, an image X (309) is displayed. As in the case of the upper field 301, when the user operates the operation unit 4 to instruct changing of a screen of the lower field 302, a thumbnail image of subsequent image data containing no shooting date information is displayed.

Next, an example of appending information of a shooting period will be described. The user operates the operation unit 4 to display the image X (309) to which information of a shooting period is to be appended in the lower field 302. In the upper field 301, the user selects two images based on which to determine a shooting period of the image X (309) displayed in the lower field 302 while viewing thumbnail images.

More specifically, when two images to be selected are displayed adjacent each other, a portion between the two images is selected as illustrated in FIG. 3A. In the example illustrated in FIG. 3A, a portion between the images C and D (304 and 305) is selected. When a shooting period is instructed to be determined in this state, a shooting period of the image X (309) is between the images C and D (304 and 305). In other words, a start date of the shooting period of the image X (309) is set to "Oct. 13, 2005" corresponding to the shooting date of the image C (304), and an end date thereof is set to "Dec. 3, 2005" corresponding to the shooting date of the image D (305).

When two images based on which to determine a shooting period of the image X (309) displayed in the lower field 302 are not displayed adjacent each other, the user scrolls the upper field 301 to individually select the two images. When the image D (305) is selected as illustrated in FIG. 3B and the image G (308) is selected as illustrated in FIG. 3C, a start date of the shooting period of the image X (309) is set to "Dec. 3, 2005" corresponding to the shooting date of the image D (305), and an end date thereof is set to "Mar. 3, 2006" corresponding to the shooting date of the image G (308).

In a file structure of the image data to which information of a shooting period is appended in the shooting period information appending mode, the Exif information 203 is appended as illustrated in FIG. 2B. Data of the start and end dates of the shooting period designated in the shooting period information appending mode enters the start and end dates 205 and 206 of the shooting period of the Exif information 203, and blank data indicating an unknown shooting date enters the shooting date 204.

When the user individually selects the two images as described above, if the user selects two identical images or two images of identical shooting dates, the same shooting date as that of the image data selected in the upper field 301 is set for the image data X (309) displayed in the lower field 302. With this operation, the image data to which the shooting date information is appended can be processed as image data whose shooting date is known thereafter as in the case of image data shot by a digital still camera. A file structure of the image data in this case is as illustrated in FIG. 2A, and the same data as that of the shooting date of the selected image data enters the shooting date 204.

In this case, the same date as the shooting date 204 can be set in the start and end dates 205 and 206 of the shooting period in addition to the shooting date 204. Accordingly, when the same date is set in the shooting date and the start and end dates of the shooting period, the user can know that the image is the one to which shooting date information has been appended subsequently. For example, in displaying a search result, displaying or handling can be distinguished from another, for example, by displaying an image to which shooting date information has been appended subsequently with a special mark, or changing a display order of results based on whether the image is the one to which shooting date information has been appended subsequently. A file structure of the image data in this case is as illustrated in FIG. 2B, and the same data as that of the shooting date of the selected image enters the shooting date 204 and the start and end dates 205 and 206 of the shooting period.

With the above-described operation, the user can set and append information of a shooting period or a shooting date to image data containing no shooting date information by using a thumbnail image of image data whose shooting date is known. As the user carries out the operation while viewing thumbnail images, information of a given degree of certainty, such as a shooting period, can be easily set, and there is a high possibility that the image data in which the shooting period has been set was shot in a period from the start date to the end date of the shooting period.

According to an exemplary embodiment, one image is displayed in the lower field 302. However, a plurality of images can be displayed in the lower field 302, and the same shooting period information can be set in the plurality of image data all together.

Figure 11A:
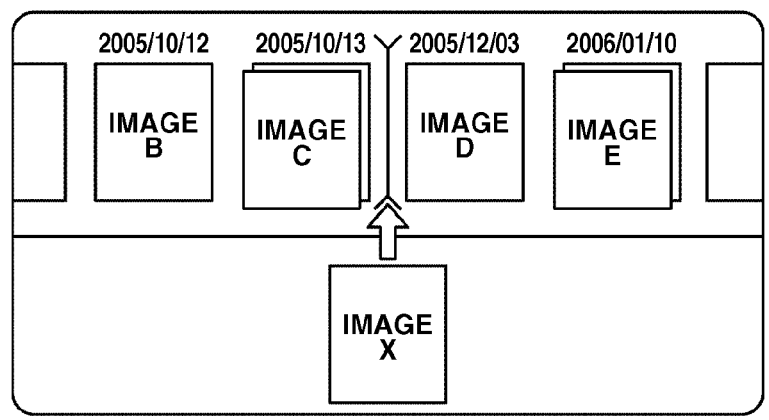
FIGS. 11A and 11B are diagrams each illustrating a display example on a display unit in a shooting period information appending mode.
Figure 11B:
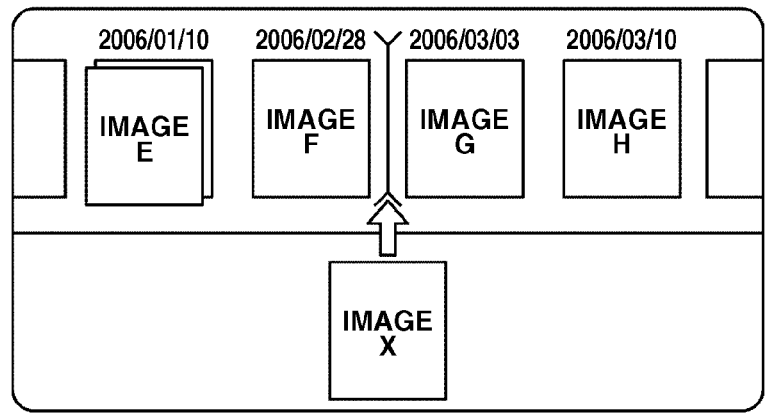

According to an exemplary embodiment, when two images not adjacent each other are selected, the individual images are independently selected. However, two images to be selected can be selected in such a manner as to be pinched. More specifically, when a portion between the images C and D is selected as illustrated in FIG. 11A and then a portion between the images F and G is selected as illustrated in FIG. 11B, shooting dates of images at both ends among images within the selected range, i.e., shooting dates of the images D and F in the examples illustrated in FIGS. 11A and 11B, are set as start and end dates of a shooting period. In other words, in the examples illustrated in FIGS. 11A and 11B, a start date of the shooting period is set to "Dec. 3, 2005", and an end date thereof is set to "Feb. 28, 2006". In this case, in setting the shooting period, to always designate an inter-image portion, when one image is independently designated, a shooting date can immediately be set to the selected image data.

The exemplary embodiment illustrates an example of an operation of the operation unit 4. However, an instruction can be made to set information of a shooting period and a shooting date by using a pointing device such as a mouse. More specifically, when a thumbnail image of image data containing no shooting date information is dragged and dropped between thumbnail images of image data whose shooting dates are known, a shooting period is set to the target image data based on both shooting dates. When a thumbnail image of image data containing no shooting date information is dragged and dropped onto a thumbnail image of image data whose shooting date is known, a shooting date is set to the target image data.

Figure 4:
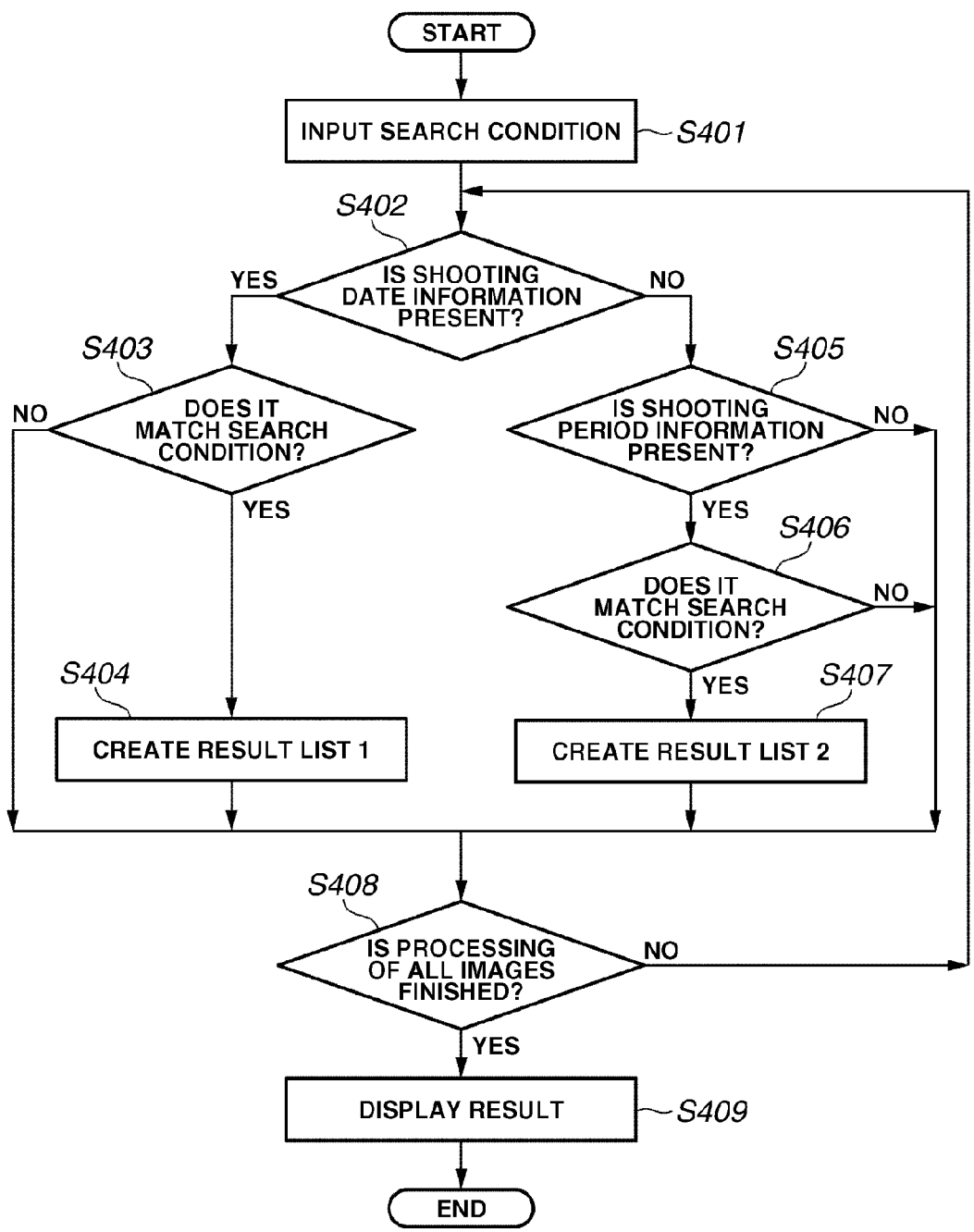
FIG. 4 is a flowchart illustrating search processing at the time of designating a date.

A search example when image data to which shooting period information is appended and normal image data are mixed will be described. First, an example of designating a specific date to execute searching will be described. FIG. 4 is a flowchart illustrating search processing at the time of designating a date. Referring to FIG. 4, a processing flow will be described.

First, in step S401, a user operates the operation unit 4 of the multifunction printer 100 to input a date as a search condition.

In step S402, the CPU 20 selects one image file stored on the HDD 11 and yet to be subjected to search work, and determines whether information of the shooting date 204 is present in the Exif information 203 of the target image file. If information of the shooting date 204 is present (YES in step S402), the process proceeds to step S403. If information of the shooting date 204 is not present (NO in step S402), then the process proceeds to step S405. Further, when data indicating unknown is found in the shooting date 204 of the Exif information 203, it is also determined that information of the shooting date 204 is not present. In the case of a file of image data shot by a general digital still camera, information of the shooting date 204 is appended to the Exif file 203, and thus the process proceeds to step S403. In the case of image data captured by a scanner, as data indicating unknown is set in the shooting date 204 for a file to which the Exif information 203 is not appended or a file to which information of a shooting period is appended in the shooting period information appending mode, the process proceeds to step S405.

In step S403, the CPU 20 compares the date as a search condition input in step S401 with the shooting date 204 of the Exif information 203 of the target image file. If the date input as a search condition matches the shooting date 204 of the Exif information 203 (YES in step S403), the process proceeds to step S404. In step S404, the CPU 20 adds the target image file to a result list 1 and updates the result list 1. Then, the process proceeds to step S408. The result list 1 is a list of images in which information of the shooting date 204 of the Exif information 203 matches the date as a search condition, and is managed separately from a result list 2 described below. This is for the purpose of displaying a search result separately from a search result of an image having information of a shooting period at the time of displaying the search result. If the date input as a search condition does not match the shooting date 204 of the Exif information 203 in step S403 (No in step S403), the process proceeds to step S408.

In step S405, the CPU 20 determines whether information of a shooting period (start and end dates 205 and 206) is present in the Exif information 203 of the target image file. If information of the shooting period is present (YES in step S405), the process proceeds to step S406. If information of the shooting period is not present (NO in step S405), the process proceeds to step S408. In step S406, the CPU 20 determines whether the date as search condition input in step S401 is present within a range of the shooting period. More specifically, when S is a date as a search condition, D1 is a start date of the shooting period of the target image file, and D2 is an end date thereof, if a relation of $D1 \leq S \leq D2$ is established (YES in step S406), the process proceeds to step S407. In step S407, the CPU 20 adds the target image data to the result list 2 and updates the result list 2. The result list 2 is a list of image data containing information of the shooting period and matching the date as a search condition. When the target image data is added to the result list 2 to update the result list 2, image data is sorted in order of lengths of shooting periods of target image data, more specifically, in order of shorter lengths of "end date D2-start date D1". Sorting is executed in order of shorter shooting periods because a degree of matching with the date as a search condition is higher as a period is shorter. Upon completion of updating the result list 2 in step S407, the process proceeds to step S408. If the relation of $D1 \leq S \leq D2$ is not established in step S406 (NO in step S406), the process proceeds to step S408.

In step S408, the CPU 20 determines whether the search work has been finished for all of the image files stored on the HDD 11. If finished (YES in step S408), the process proceeds to step S409. If not finished (NO in step S408), the process returns to step S402 to repeat the series of operations of steps S402 to S407.

In step S409, the CPU 20 displays a result using two lists, i.e., the result list 1 created in step S404 and the result list 2 created in step S407. First, the CPU 20 displays contents of the result list 1 on the display unit 5, and subsequently displays contents of the result list 2. Then, the processing ends.

Figure 5:
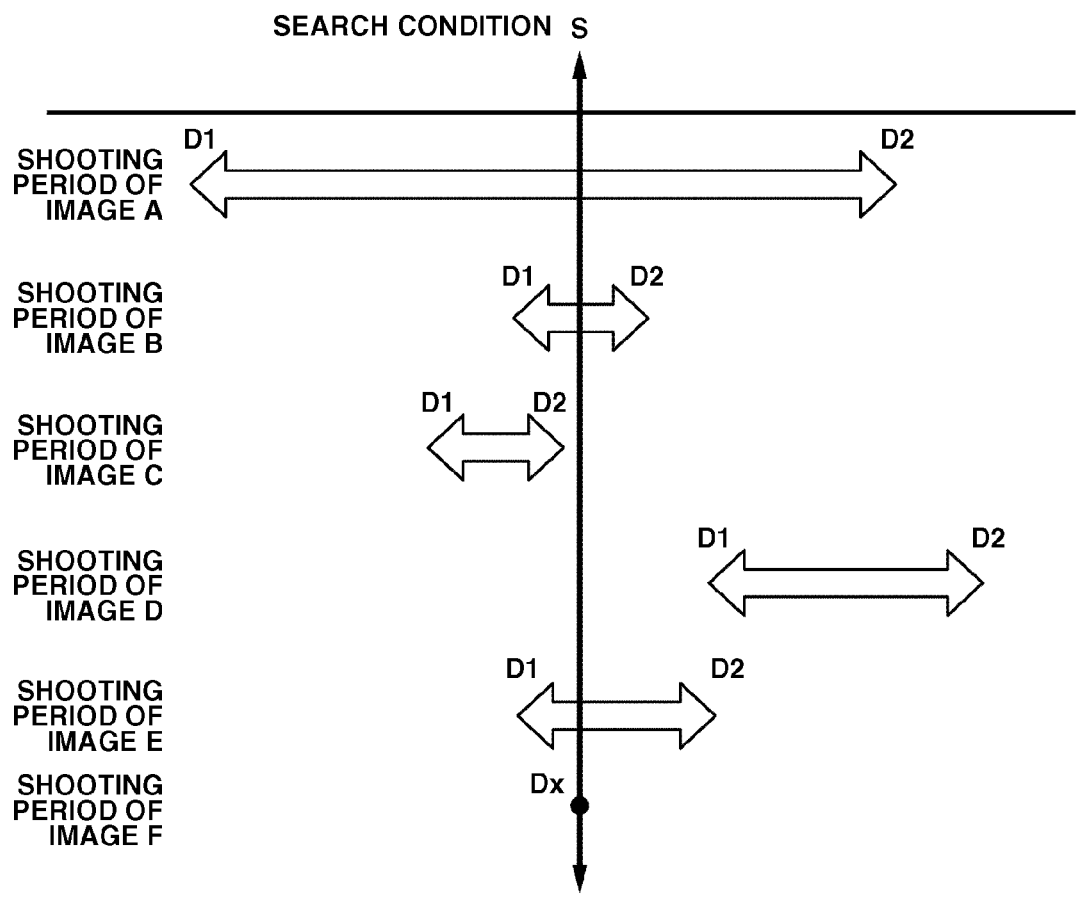
FIG. 5 is a diagram illustrating an example of a search condition at the time of designating a date.

An example of executing search processing in FIG. 4 under conditions illustrated in FIG. 5 will be described. In the example illustrated in FIG. 5, a total of six image data of images A to F is stored on the HDD 11. Start and end dates D1 and D2 of a shooting period are appended to the five image data of the images A to E. The image F is image data shot by a digital still camera, and a shooting date Dx is appended thereto.

The image F is registered in the result list 1 in step S404 as its shooting date Dx matches a date S designated as a search condition by the user. On the other hand, the images A, B, and E are registered in the result list 2 in step S407 as the date S as a search condition is present within a range of start and end dates D1 and D2 of their shooting periods. In this case, as lengths (D2-D1) of the shooting periods of the images A, B, and E are shorter in order of the images B, E, and A, the order in the result list 2 is the images B, E, and A. Neither of the images C and D are registered in the result list 1 or 2 as the date S as a search condition is present outside a range of start and end dates D1 and D2 of their shooting periods.

Figure 6A:
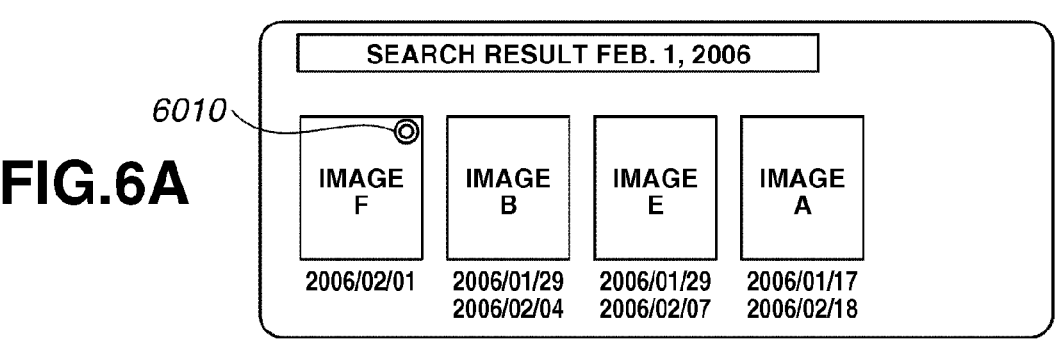
FIGS. 6A and 6B are diagrams each illustrating a display example of a search result.

Lastly, in step S409, results are displayed in order of the result lists 1 and 2. As illustrated in FIG. 6A, from the left, thumbnail images of the image F of the result list 1 and then the images B, E, and A of the result list 2 are displayed. In the result display screen, as the images are displayed more on the left side, they match the search condition more closely. An image (the image F according to an exemplary embodiment) registered in the result list 1 is displayed with a double circle mark 6010 to be distinguished from the other images, so that user's visibility can be improved. An example of processing and a processing result when the date is designated as a search condition has been described above.

Next, an example of executing searching by designating a period rather than a specific date will be described. In search processing in this case, as a search condition has a range and a shooting period also has a certain range, a score value SC taking a value of 0 to 100 is calculated for each image data according to the following rules (1) to (3). Images having score values SC other than 0 are sorted in order of larger score values SC to be displayed as search results.

(1) A score value SC of an image whose shooting date or period is within a period as a search condition is set to 100.

(2) A score value SC of an image whose shooting date or period is completely outside a period as a search condition is set to 0.

(3) A score value SC of an image whose shooting period is partially within a period as a search condition is set to a ratio of a length of the shooting period to an overlapped period between the period as a search condition and the shooting period.

Figure 7:
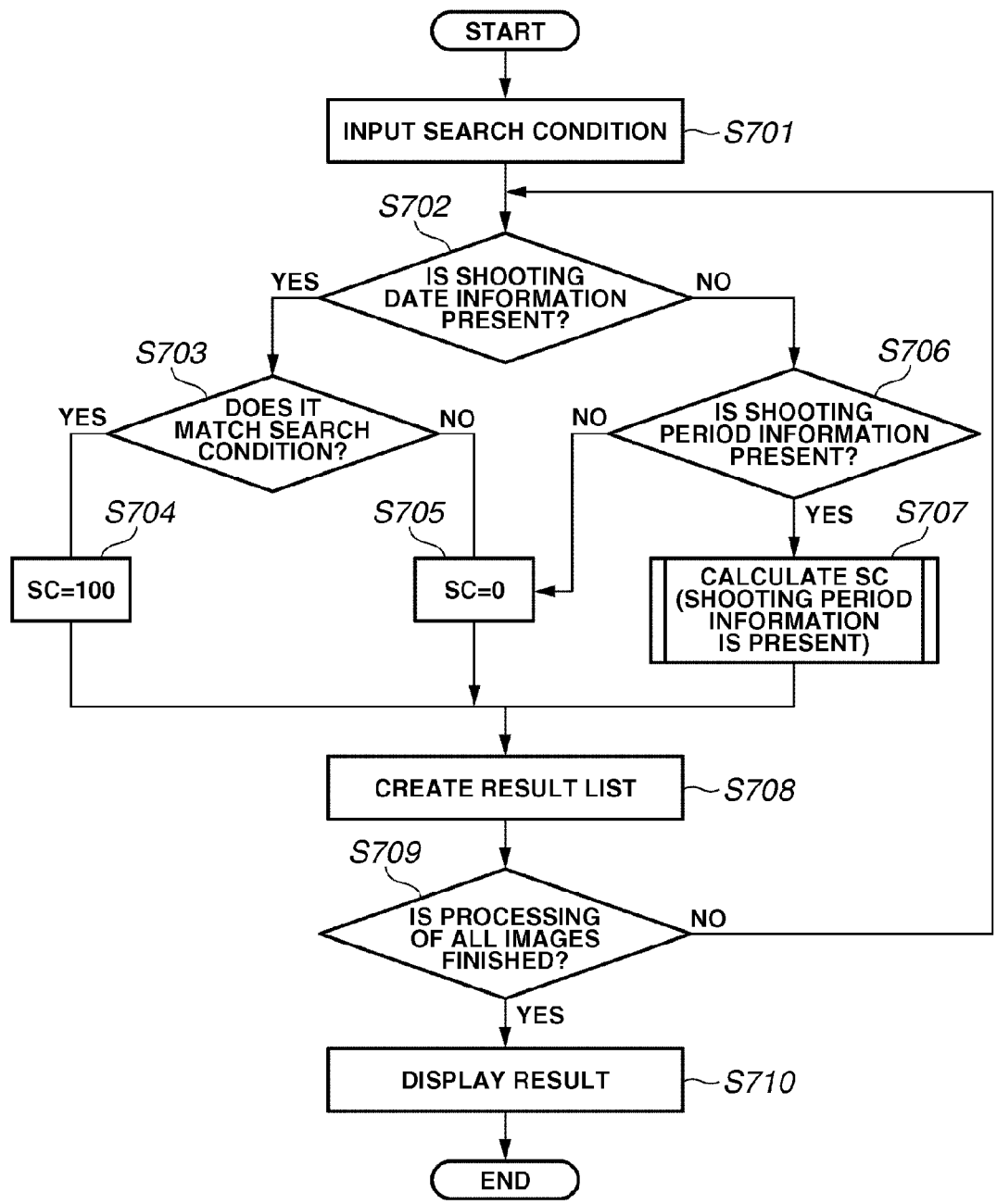
FIG. 7 is a flowchart illustrating search processing at the time of designating a period.
Figure 8:
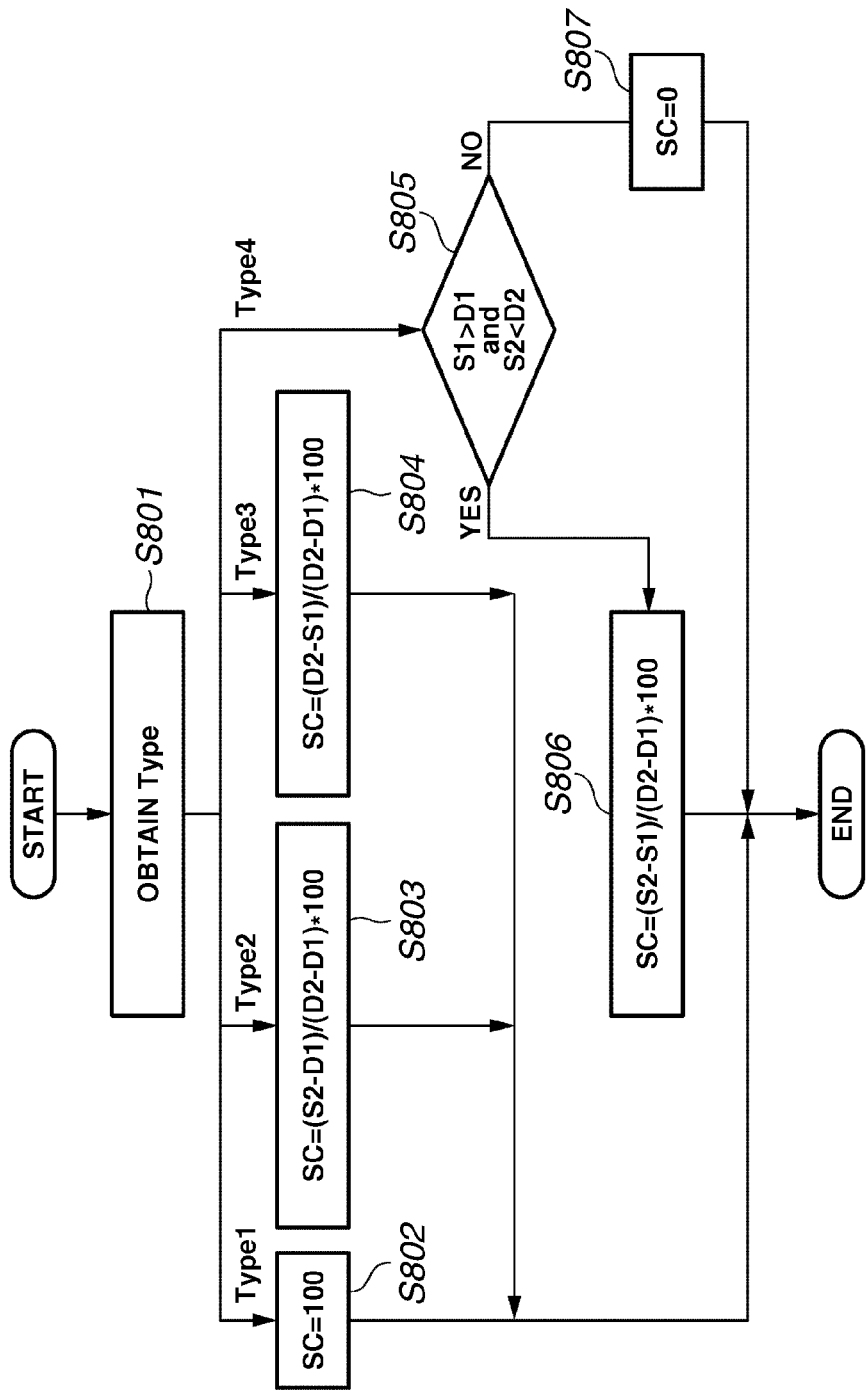
FIG. 8 is a flowchart illustrating calculation processing of a score value when a target image file includes shooting period information.

Each of FIGS. 7 and 8 is a flowchart illustrating search processing when a shooting period is designated. A processing flow will be described with reference to FIGS. 7 and 8. First, referring to FIG. 8, calculation processing of a score value SC when a target image file contains information of a shooting period will be described. In step S801, the CPU 20 classifies degrees of overlapping between the period as a search condition and the shooting period into four types. FIG. 10 illustrates a classification method for four types. Four types are classified based on whether start and end dates D1 and D2 of the shooting period are within a range of start and end dates of the period as a search condition. In a table illustrated in FIG. 10, a state "in" indicates that the start or end date D1 or D2 of the shooting period is within the range, and a state "out" indicates that the start or end date D1 or D2 of the shooting period is outside the range. For example, "Type2" indicates a state in which a start date D1 of a shooting period is within the period as a search condition (in), while an end date D2 thereof is outside the period as a search condition (out).

Thus, the CPU 20 classifies the target image file into four types in step S801. In the case of "Type1" to "Type3", score values SC are calculated with calculation equations of steps S802 to S804, respectively. Start and end states S1 and S2 of the period as a search condition are always set to "S2>S1".

In the case of "Type4", there are two cases, i.e., a case where the shooting period completely includes the period as a search condition and a case where these periods do not overlap each other at all. Accordingly, in step S805, the CPU 20 determines in which of the states "Type4" is. If the shooting period completely includes the period as a search condition, in other words, in the case of "S1>D1 and S2<D2" (YES in step S805), a score value SC is calculated with a calculation equation in step S806. If otherwise (NO in step S805), a score value is set to 0 in step S807. Thus, the calculation processing of the score value SC when the target image file contains information of a shooting period is completed.

Next, referring to FIG. 7, search processing when a period is designated will be described. First, in step S701, the user operates the operation unit 4 of the multifunction printer 100 to input a period as a search condition.

In step S702, the CPU 20 selects one image file stored on the HDD 11 and yet to be subjected to search work, and determines whether information of the shooting date 204 is present in the Exif information 203 of a target image file. If information of the shooting date 204 is present (YES in step S702), the process proceeds to step S703. If information of the shooting date 204 is not present (NO in step S702), the process proceeds to step S706. Further, when data indicating unknown is found in the shooting date 204 of the Exif information 203, it is also determined that information of the shooting date 204 is not present. In the case of a file of image data shot by a general digital still camera, information of the shooting date 204 is appended to the Exif file 203, and thus the process proceeds to step S703. In the case of image data captured by a scanner, as data indicating unknown is set in the shooting date 204 for a file to which the Exif information 203 is not appended or a file to which information of a shooting period is appended in the shooting period information appending mode, the process proceeds to step S706.

In step S703, the CPU 20 compares the date as a search condition input in step S701 with the shooting date 204 of the Exif information 203 of the target image file. If the shooting date 204 is determined to be within the period as a search condition (YES in step S703), the process proceeds to step S704. In step S704, a score value SC is set to 100. Then, the process proceeds to step S708. On the other hand, if the shooting date 204 is determined to be outside the period as a search condition (NO in step S703), the process proceeds to step S705. In step S705, a score value SC is set to 0. Then, the process proceeds to step S708.

In step S706, the CPU 20 determines whether information of a shooting period (start and end dates 205 and 206) is present in the Exif information 203 of the target image file. If information of the shooting period is present (YES in step S706), the process proceeds to step S707. If not present (NO in step S706), the process proceeds to step S705. In step S705, a score value SC is set to 0. Then, the process proceeds to step S708. In step S707, a score value SC is calculated for the image file containing information of the shooting period. The processing of step S707 is as described above referring to FIG. 8. After the score value SC is calculated, the process proceeds to step S708.

In step S708, if the score values SC obtained for the target image file in steps S702 to S707 are not 0, the CPU 20 adds the target image file to a result list to update the result list. In this case, the CPU 20 sorts image files in order of larger score values SC. When the score values SC are equal, a previously retrieved image file is higher in order in the result list.

In step S709, the CPU 20 determines whether search work has been finished for all the image files stored on the HDD 11. If finished (YES in step S709), the process proceeds to step S710. If not finished (NO in step S709), the process proceeds to step S702 to repeat the series of operations of steps S702 to S709.

In step S710, the CPU 20 displays contents of the result list created in step S708 on the display unit 5. Thus, the processing ends.

Figure 9:
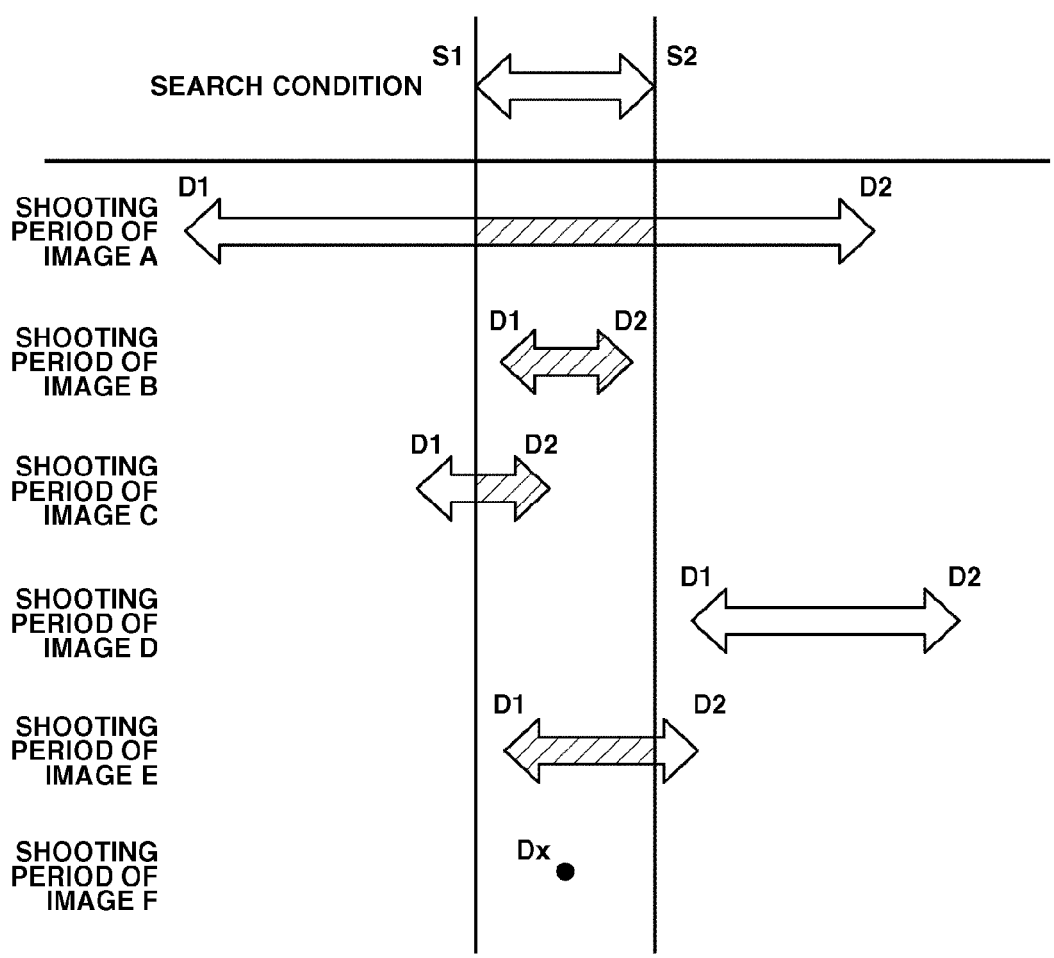
FIG. 9 is a diagram illustrating an example of a search condition at the time of designating a period.

A specific example of executing search processing illustrated in FIGS. 7 and 8 under conditions illustrated in FIG. 9 will be described. In the example illustrated in FIG. 9, a total of six image data of images A to F are stored on the HDD 11. Start and end dates D1 and D2 of shooting periods are appended to the five image data of the images A to E. The image F is image data shot by a digital still camera, and a shooting date Dx is appended thereto.

Assuming that start and end dates S1 and S2 are a search condition designated by the user, the image A is determined to be "Type4" in step S801, and as the shooting period includes the period as a search condition, a score value SC is calculated with the equation in step S806. The image B is determined to be "Type1" in step S801, and a score value is set to 100. Thereafter, similarly, the images C to E are respectively determined to be "Type3", "Type4", and "Type2", and score values SC are calculated with equations corresponding to the respective types. For the image F, a score value SC is set to 100 in step S704.

Figure 6B:
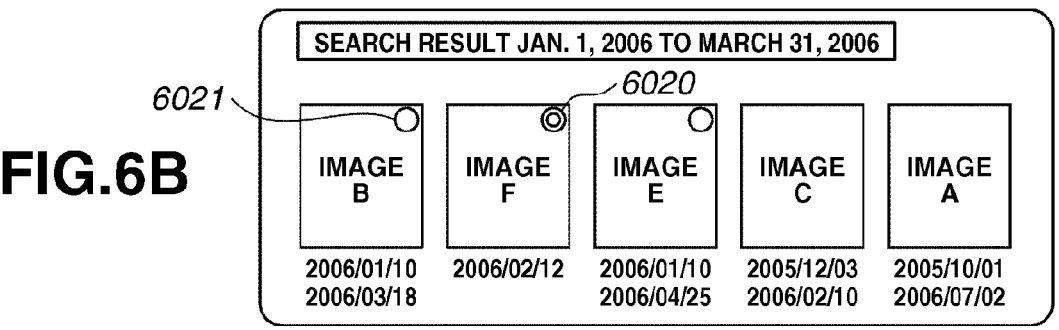

As a result, assuming that search work is carried out in order of the images A to F, the result list created in step S708 indicates image files sorted in order of larger score values SC. If the score values are equal, the result list indicates image files sorted in order of search work. Accordingly, the images B, F, E, C, and A are sorted in this order. Thus, the result list indicates thumbnail images in order of the images B, F, E, C, and A from the left as illustrated in FIG. 6B. In the displayed result, an image in which information of the shooting date 204 is present in the Exif information 203 is displayed with a double circle mark 6020, and an image in which the period as a search condition includes the shooting period is displayed with a circle mark 6021. Accordingly, visibility of the result can be improved for the user.

Among images whose score values SC are 100, images in which information of the shooting date 204 of the Exif information 203 is present can be displayed higher in order. With this displaying, according to an exemplary embodiment, the display order is the images F, B, E, C, and A from the left, and the images with the double circle mark 6020 and the circle mark 6021 are collectively displayed. An example of search processing and a processing result when a period is designated as a search condition has been described above.

An exemplary embodiment has been described by taking the example of a multifunction printer with a hard disk. However, the present invention can be implemented in image management software of a personal computer or various image management apparatuses, such as a photostorage device.

The present invention is not limited to a scanned image, but can be applied to a case where no shooting date information can be appended or a shooting date can be wrong while shooting date information is appended. For example, even when a user shoots an image without knowing that a built-in clock of the digital still camera is reset due to battery shutoff, as long as the shot image data can be extracted after the clock is reset, the present invention can be applied to the image data to set information of a shooting period or date.

Second Exemplary Embodiment

A second exemplary embodiment will be described by taking an example where a shooting period weighting coefficient is appended. A basic configuration and a processing operation of a multifunction printer are similar to those of the first exemplary embodiment, and thus differences from the first exemplary embodiment will mainly be described.

The shooting period weighting coefficient represents which of start and end dates of a shooting period an actual shooting date is close to with a numerical value. The shooting period weighting coefficient can take a value from −50 to 50. As a minus value is larger around 0, a shooting date is closer to the start date. As a plus value is larger, a shooting date is closer to the end date. However, as an actual shooting date is unknown, a user can determine a value of the coefficient with a feeling. For example, if the user sets the shooting period weighting coefficient to 45, the user may think that an actual shooting date is closer to the end date of the shooting period.

Figure 12:
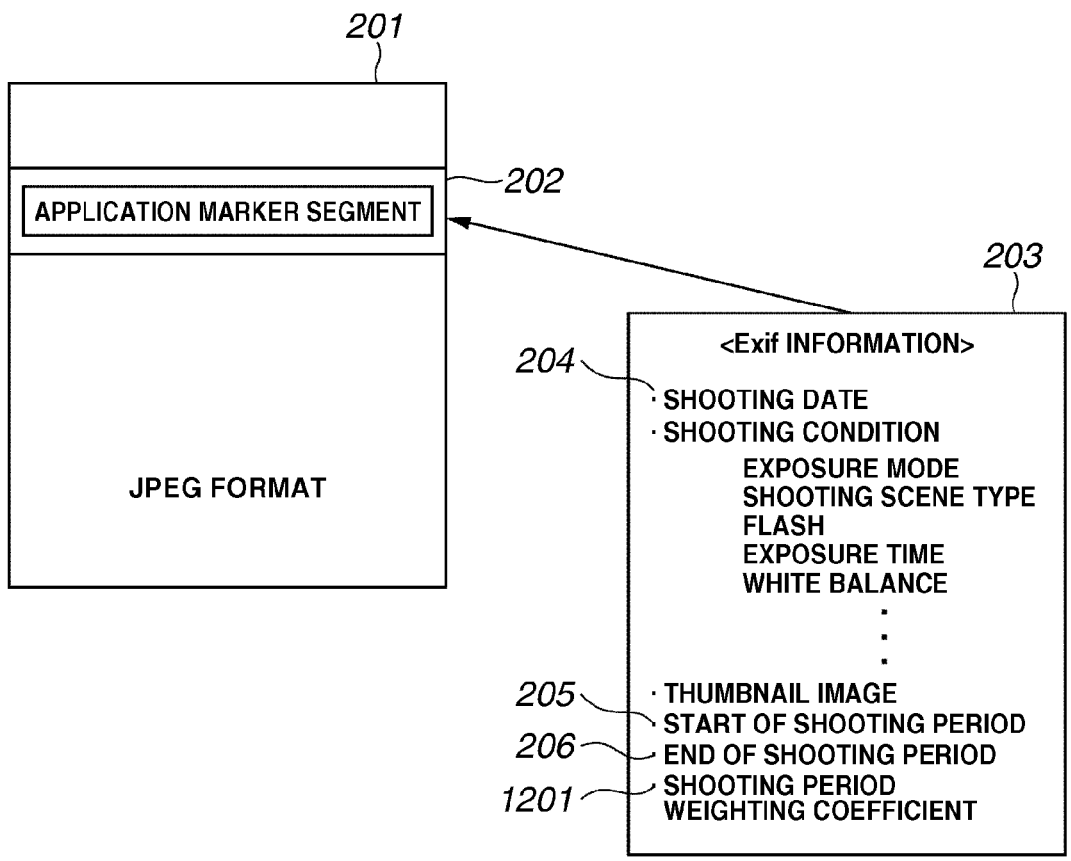
FIG. 12 is a diagram illustrating an example in which a shooting period weighting coefficient is appended to an Exif file of JPEG format.

FIG. 12 illustrates an example where a shooting period weighting coefficient 1201 is appended to Exif information 203 of an Exif file of JPEG format. Portions similar to those of FIG. 2 are denoted by similar reference numerals, and a detailed description thereof will not be repeated.

Figure 13A:
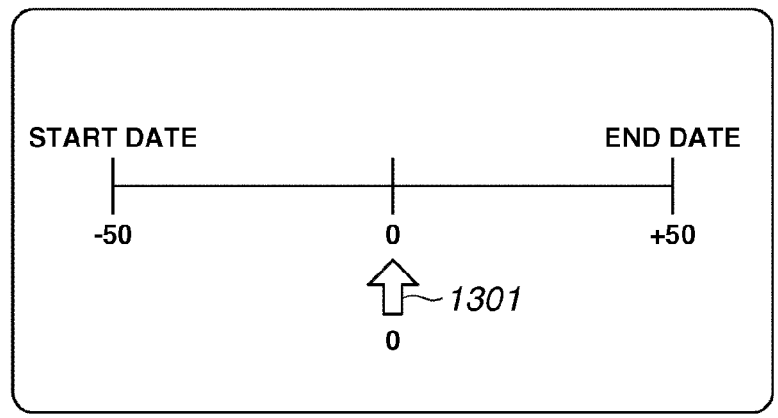
FIGS. 13A to 13C are diagrams each illustrating an example of a shooting period weighting coefficient setting screen.
Figure 13B:
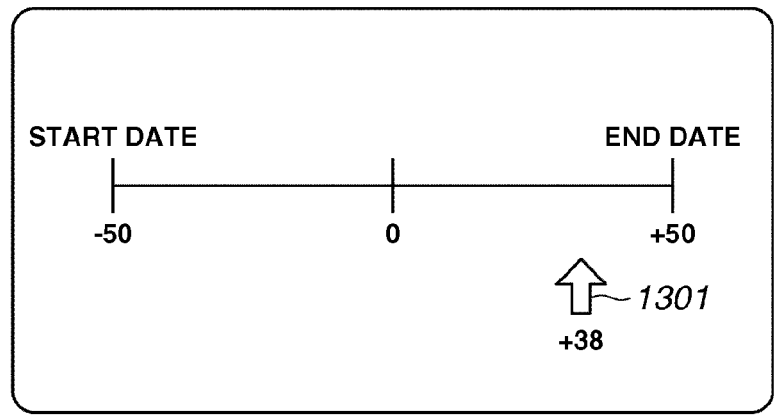
Figure 13C:
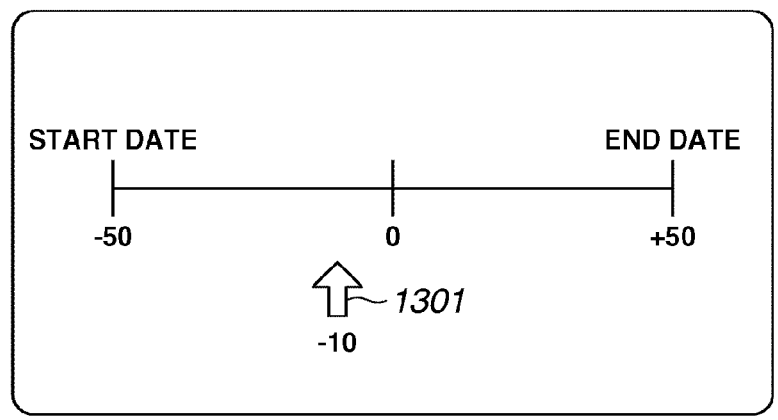

A setting method for a shooting period weighting coefficient carried out by the user will be described. First, the user sets a shooting period according to the method described in the first exemplary embodiment. After information of the shooting period is appended to image data, for example, as illustrated in FIGS. 13A to 13C, a shooting period weighting coefficient setting screen is displayed to prompt the user to set a shooting period weighting coefficient. FIG. 13A illustrates a shooting period weighting coefficient setting screen immediately after the start. In FIG. 13A, a cursor 1301 is located between start and end dates, and a value of the coefficient is 0. The user can use the operation unit 4 to move the cursor 1301 left and right, and can set a coefficient value between −50 to +50. For example, in FIG. 13B, "+38" is set as a coefficient value, indicating that a shooting date is very close to the end date. On the other hand, in FIG. 13C, "−10" is set as a coefficient value, indicating that a shooting date is somewhat close to the start date. In this way, the user can set the shooting period weighting coefficient.

Next, an example of executing searching by designating a specific date when a shooting period weighting coefficient is set will be described. A flowchart of search processing is similar to the series of operations of steps S401 to S409 of the first exemplary embodiment illustrated in FIG. 4. A difference is list sorting processing in creation and updating processing of the result list 2 of step S407. According to the first exemplary embodiment, the sorting processing is carried out in order of shorter shooting periods. According to the second exemplary embodiment, however, sorting processing is carried out for a calculation result that uses a shooting period weighting coefficient. More specifically, a score value SC is calculated by the following equation based on a shooting period weighting coefficient k of a target image file, start and end dates D1 and D2 of a shooting period, and a date S as a search condition.

$$\text{Score value } SC = |D1 + ((D2 - D1) * (k + 50) \div 100)) - S|$$

The score value SC indicates a difference between a virtual shooting date represented by a shooting period weighting coefficient and a date as a search condition. As score value SC is smaller, the virtual shooting date and the date as a search condition are closer to each other. Thus, according to an exemplary embodiment, in step S407, the result list 2 is subjected to sorting in order of smaller score values. With this processing, a search result taking the shooting period weighting coefficient designated by the user into consideration can be displayed.

As described above, a representation method for a shooting period can be expanded by using a shooting period weighting coefficient.

Third Exemplary Embodiment

The first and second exemplary embodiments have been described with reference to a case where information of a shooting period is appended to image data (image file). In terms of setting (appending) a period containing two dates, i.e., start and end dates, to a target file, the present invention can be applied to a file creation date. A third exemplary embodiment will be described by taking an example where period information is appended to a file creation date.

According to a file system of a general operating system (OS), each file is managed with appended information of a file creation date. In addition to such an existing creation date, information of two dates, i.e., start and end dates of a file creation period, can be appended as creation period information. This creation period information indicates a high possibility of creation of a target file within the period. For example, if start and end dates of a file creation period are respectively set to Aug. 1, 2006, and Aug. 12, 2006, there is a high possibility that a target file was created within the period of Aug. 1, 2006 to Aug. 12, 2006.

Figure 14:
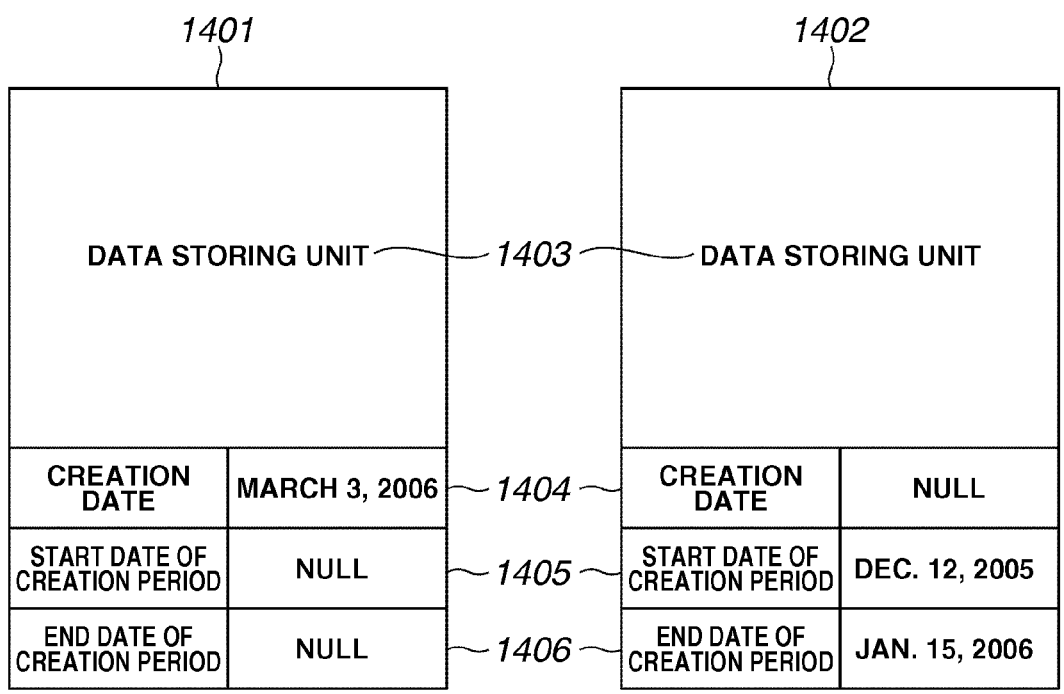
FIG. 14 is a conceptual diagram of a file structure to which creation period information is appended.

FIG. 14 is a conceptual diagram of a file structure having appended creation period information. Each of files 1401 and 1402 includes a data storing unit 1403 for storing actual data, a creation date information storing unit 1404 for storing information of a file creation date, a creation period start date information storing unit 1405 for storing information of a start date of a creation period, and a creation period end date information storing unit 1406 for storing information of an end date of the creation period.

The file 1401 is an example of a file in which no creation period information is present. In this case, values of "NULL" indicating absence of date information are set to the creation date information storing unit 1404 and the creation period start date information storing unit 1405.

On the other hand, the file 1402 is an example of a file to which creation period information is appended. Dates are set to the creation period start date information storing unit 1405 and the creation period end date information storing unit 1406. A value of "NULL" is set to the creation date information storing unit 1404.

In other words, in FIG. 14, the file 1401 is a file created on Mar. 3, 2006, and the file 1402 is a file highly likely to have been created within the period of Dec. 12, 2005 to Jan. 15, 2006. Only creation dates are set in all newly created files, and a value of "NULL" is set in each of start and end dates of a creation period. When a creation period is set, a value of "NULL" is set in a creation date.

A method for setting a creation period will be described below. A method for appending creation period information to a target file is similar to the appending method for a shooting period described in the first exemplary embodiment. A user can optionally select two files having respectively set creation dates. Accordingly, the creation dates of the two files are set in start and end dates of a creation period of the target file, respectively. For example, two files having respectively set creation dates can be dragged and dropped onto a file to which creation period information is to be appended. Alternatively, a user can directly input start and end dates of a creation period to the target file.

A method for searching for a file based on a creation date in a case where files containing creation date information appended thereto and files containing creation period information appended thereto are mixedly stored in an HDD will be described below. According to this method, a series of operations of steps S401 to S409 of the first exemplary embodiment illustrated in FIG. 4 is carried out by substituting the shooting date with a file creation date and the shooting period with a creation period. With these operations, in a search result, files whose creation dates match a date as a search condition are first displayed, and then files including the date as a search condition within creation periods are displayed in order of shorter creation periods.

With the creation period information used, for example, even when conference materials are captured by a scanner to be converted into portable document format (PDF) files, not file creation dates, i.e., scanned dates of the materials, but actual creation dates of the materials can be processed with a given degree of certainty. Thus, without any dependence on scanted dates, the user can search for a file by using creation dates of files including scanned files as search conditions.

As described above, attribute information using a period can be applied not only to a shooting period but also other periods, such as a file creation period.

Other Embodiments

The present invention can be also achieved by supplying a storage medium storing software program code to realize the functions of the exemplary embodiments to a system or an apparatus, and reading and executing the program code stored in the storage medium by a computer (or a central processing unit (CPU) or a micro processing unit (MPU)) of the system or the apparatus.

In this case, the program code read from the storage medium itself realizes the functions of the exemplary embodiments, and the program code itself and the storage medium storing the program code implement the present invention.

The storage medium to supply the program code includes, for example, a floppy disk, a hard disk, an optical disk, a magneto-optical disk, a compact disc-read only memory (CD-ROM), a CD-recordable (CD-R), a magnetic tape, a nonvolatile memory card, and a ROM.

Not only the functions of the exemplary embodiments are realized with the execution of the read program code by the computer, but also, based on instructions of the program code, a basic system or an operating system (OS) running in the computer can execute a part or the whole of actual processing to realize the functions of the exemplary embodiments.

Furthermore, the program code read from the storage medium can be written in a memory provided in a function expansion board inserted into a computer or a function expansion unit connected to the computer, and then, based on instructions of the program code, a CPU provided in the function expansion board or the function expansion unit can execute a part or the whole of actual processing to realize the functions of the exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A data management apparatus capable of managing data stored in a storage unit, the data management apparatus comprising:
   a designation unit configured to designate, from among the data stored in the storage unit, data including information on a predetermined date;
   a setting unit configured to set, based on the information on the predetermined date included in the data designated by the designation unit, information on a date to data which is to be stored in the storage unit and which is other than the data designated by the designation unit;
   a search unit configured to search data, from among the data stored in the storage unit, based on a search condition which is either a date or a period;
   a management unit configured to manage data to add, from among the data searched by the search unit, data of which the information on the predetermined date is known to a first result list and data to which the information on the date has been set by the setting unit to a second result list; and
   a first display control unit configured to cause a display unit to display a list of the data searched by the search unit in a manner such that each data included in the displayed list is accompanied with an identifier for distinguishing whether the data is searched out from among the data of the first result list or from among the data of the second result list.

2. The data management apparatus according to claim 1, wherein the data is image data in an Exchangeable Image File Format (Exif),
   wherein the designation unit designates, from among image data stored in the storage unit, image data including information on a shooting date as Exif information, and
   wherein the setting unit sets the shooting date to image data other than the image data designated by the designation unit.

3. The data management apparatus according to claim 1, wherein the designation unit designates two pieces of image data each including information on a shooting date, and
   wherein the setting unit sets the shooting date included in a first designated piece of image data of the designated two pieces of image data and the shooting date included in a second designated piece of image data of the designated two pieces of image data as a start date and an end date of a shooting period of image data other than the designated two pieces of image data, respectively.

4. The data management apparatus according to claim 1, wherein the setting unit sets the shooting date included in one piece of image data as a start date and an end date of a shooting period of image data other than the designated one piece of image data.

5. The data management apparatus according to claim 1, further comprising a second display control unit configured to cause the display unit to display a thumbnail image of the data stored in the storage unit,
   wherein the designation unit designates data corresponding to a thumbnail image selected by a user from among thumbnail images displayed on the display unit which has been caused to perform displaying by the second display control unit.

6. The data management apparatus according to claim 5, wherein the second display control unit causes the display unit to sequentially display a plurality of thumbnail images, wherein each thumbnail image of the plurality of thumbnail images corresponds to different one of a plurality of pieces of data stored in the storage unit, and
   wherein, in a case where a location between two thumbnail images adjacent to each other displayed on the display unit, which has been caused to perform displaying by the second display control unit, is selected by the user, the designation unit designates two pieces of image data corresponding to the two thumbnail images.

7. The data management apparatus according to claim 1, wherein, in a case where either a date or a period is designated as a search condition, the search unit searches data from the storage unit based on the information on the predetermined date for the data including the information on the predetermined date and based on the information on the date set by the setting unit for the data including the set information on the date.

8. The data management apparatus according to claim 1, wherein the setting unit sets a period as the information on the date to be set to the data other than the data designated by the designation unit, wherein the data management apparatus further comprises
   a calculation unit configured to calculate, in a case where a period is designated as a search condition, an index indicating a degree of overlapping between the period set by the setting unit and the period designated as the search condition for the data to which the information on the period has been set,
   wherein the search unit performs searching based on the index indicating the degree of overlapping calculated by the calculation unit.

9. The data management apparatus according to claim 1, wherein the setting unit sets a period as the information on the date to be set to the data other than the data designated by the designation unit, and further sets weighting to either one of a start date or an end date of the period, and
   wherein the search unit performs searching by reflecting the set weighting in a search result.

10. The data management apparatus according to claim 9, wherein the setting unit sets a weighting coefficient by designating a point in the period.

11. A method for a data management apparatus capable of managing data stored in a storage unit, the method comprising:
    designating, from among the data stored in the storage unit, data including information on a predetermined date;
    setting, based on the information on the predetermined date included in the designated data, information on a date to data which is to be stored in the storage unit and which is other than the designated data;
    searching data, from among the data stored in the storage unit, based on a search condition which is either a date or a period;

managing data to add, from among the searched data, data of which the information on the predetermined date is known to a first result list and data to which the information on the date has been set to a second result list; and causing display of a list of the searched data in a manner such that each data included in the displayed list is accompanied with an identifier for distinguishing whether the data is searched out from among the data of the first result list or from among the data of the second result list.

12. A non-transitory computer-readable storage medium storing a program causing a data management apparatus to perform the method according to claim 11.

* * * * *